UNITED STATES PATENT OFFICE.

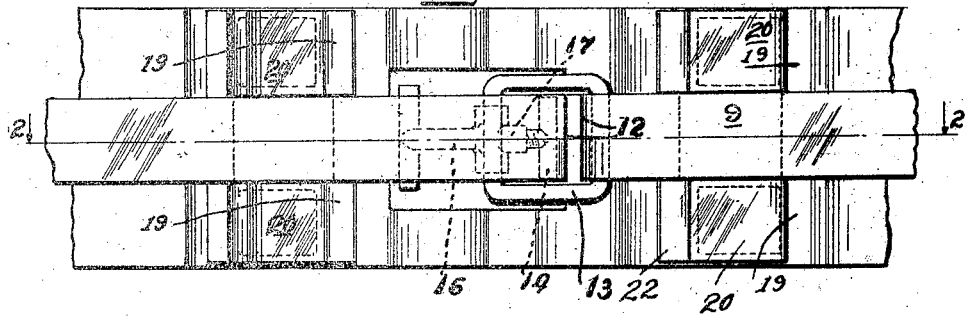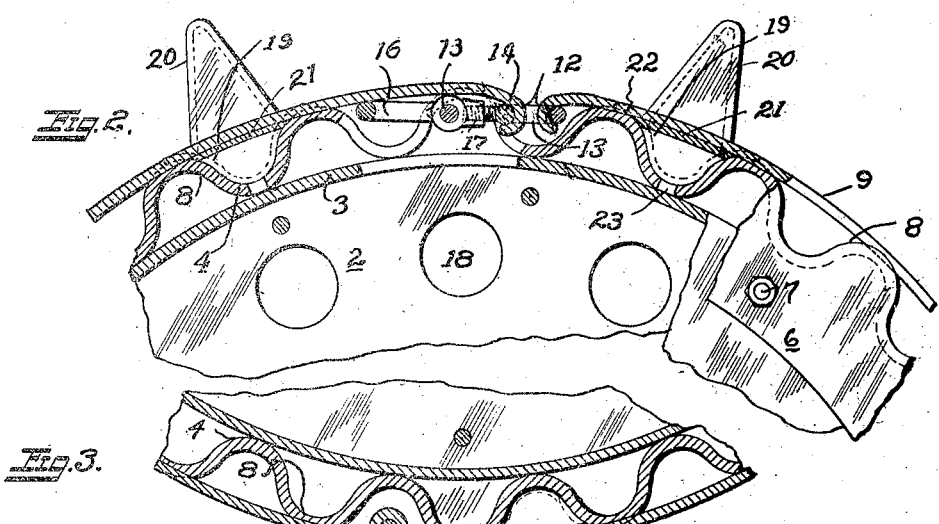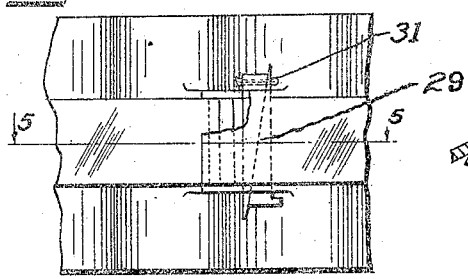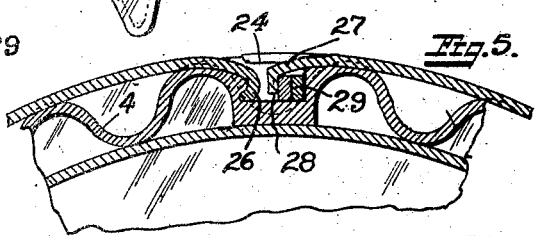

ROBERT W. A. BREWER, OF SAN FRANCISCO, CALIFORNIA.

TRACTOR-WHEEL.

1,367,943.  Specification of Letters Patent.  Patented Feb. 8, 1921.

Application filed December 24, 1918. Serial No. 268,170.

*To all whom it may concern:*

Be it known that I, ROBERT W. A. BREWER, a subject of the King of England, and a resident of the city and county of San Francisco and State of California, have invented a new and useful Tractor-Wheel, of which the following is a specification.

My invention relates to tractor wheels for roundwheel tractors and especially to the treads of said wheels.

An object of the invention is to provide a tractor wheel in which a variety of tread surfaces are available.

Another object of the invention is to provide a tractor wheel and grousers therefor which are readily attached to or detached from the tread surface of the wheel.

Another object of the invention is to provide a tractor wheel having a rim or tread surface formed with fixed grousers and means for superposing a smooth tread surface upon the grousered surface.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings;

Figure 1 is a plan view of a portion of the rim of my tractor wheel showing the detachable grousers in place.

Fig. 2 is a vertical section through a portion of the wheel rim. The plane of section is indicated by the line 2—2 of Fig. 1.

Fig. 3 is a vertical section, in the same plane as that of Fig. 2, through a portion of the rim diametrically opposite to that portion shown in Fig. 2.

Fig. 4 is a plan view of a portion of the rim of a modified form of the wheel.

Fig. 5 is a vertical section through the same portion of rim shown in Fig. 4. The plane of section is indicated by the line 5—5 of Fig. 4.

The body 2 of the wheel of my invention is formed with the rim 3 upon which a tread 4 provided with the flange 6 is secured by bolts 7 or other suitable means. The tread 4 is provided with grousers 8 fixed thereon and preferably is formed with corrugations running laterally across the face of the tread, the ridges of the corrugations forming the grousers.

This corrugated or grousered tread is suitable for general field use but would be objectionable on hard road surfaces. Means are therefore provided for modifying the grousered tread so that the wheel may be used on paved streets or hard road surfaces without damage thereto. A band 9 which conveniently may be about one-third as wide as the grousered tread is adapted to encircle the tread and be clamped or cinched in place, thus supplying a smooth tread surface. For convenience in applying, the band is preferably made in two parts pivotally connected by the pin 11, and lateral displacement of the band is avoided by shallow recesses formed in the top of each grouser 8 and in which the band lies.

Means are provided for tightening or cinching the band about the grousered tread. The ends 12 of the band are curved to form hooks. A ring 13 provided with a pivotally mounted jaw 14 is adapted to engage one of the hooked ends of the band. The jaw 14 is then engaged in the adjacent hooked end and turned by the handle 16 to draw the ends together. The parts are arranged so that when the handle 16 strikes the inside of the band, the jaw 14 has moved a small distance past the plane of the ring, the tension in the band retaining the parts in the position shown in Fig. 2, and preventing an accidental loosening of the hooked ends. Preferably the jaw 14 is made adjustable by a threaded engagement with the socket 17 integral with the handle 16. Access to the clamp is gained through an aperture 18 formed in the body of the wheel, and the tread 4 and one grouser are suitably recessed to enable the ring to be engaged with the band and the handle 16 manipulated.

Detachable grousers are provided to adapt the wheel for use is flooded or other soft grounds, and these grousers are arranged to be disposed upon the grousered thread and secured thereon by the band. The detachable grousers consist of a main body 19 preferably fitting the curve of the recess between two adjacent fixed grousers 8 and having formed thereon radially projecting portions 20. These projections are formed one on each end of the body 19, being spaced apart a distance equal to the width of the band 9. A web 21 bridges across the main body between the two projections 20. At the foot of the projections, the wall of the body 19 is extended in the wings 22 which furnish a broad base for the grouser so that its stability is increased.

When it is desired to attach the detachable grousers, as many as desired are seated upon the grousered tread and the band 9 applied. The band lies upon the web 21 between the projections 20, and in the recesses formed in the fixed grousers and when tightened into place clamps the detachable grousers rigidly into position. In order to facilitate the temporary placement of the detachable grousers while the band is being applied each one is provided with a lug or boss 23 adapted to engage a suitable aperture in the tread 4.

In Figs. 4 and 5 I have shown a modified form of tightening means for the band. The grousered tread 4 is provided with a box 24 in which the curved end 26 of the band is adapted to be hooked. The other end 27 of the band is formed with a lip 28 between which and the wall of the box, wedges 29 are adapted to be driven to tighten the band. The wedges are preferably provided with apertures which when in alinement permit a cotter pin 31 to be inserted to retain them in position.

I claim:

1. In combination with a tractor wheel having a grousered tread, separate grousers adapted to be seated on said tread between the grousers thereon, a band adapted to encircle the grousered tread and the bases of the added grousers to hold the added grousers on their seats, and means for cinching the band about the tread.

2. In combination with a tractor wheel, detachable grousers adapted to be disposed about the tread of said wheel each grouser being formed with a recess extending radially inwardly from the outer edge thereof, and means engaging in said recesses and encircling the wheel for retaining the grousers in place.

3. In a tractor wheel, a tread provided with fixed grousers, detachable grousers adapted to be seated on said tread between said fixed grousers, said detachable grousers being formed with spaced radially projecting portions connected by a web, and a band encircling the wheel and superposed upon the webs of said detachable grousers to secure them in place.

4. In a tractor wheel, a tread provided with fixed grousers, detachable grousers adapted to be seated on said tread between said fixed grousers, said detachable grousers being formed with spaced radially projecting portions connected by a web, a band encircling the wheel and superposed upon the webs of said detachable grousers to secure them in place, and means for tightening said band.

5. In combination with a tractor wheel having a grousered tread, detachable grousers adapted to be seated on said tread between said fixed grousers, both the detachable grousers and the fixed grousers having circumferentially alined recesses arranged therein, a band engaging in said recesses and encircling the wheel, and means for tightening the band.

In testimony whereof I have hereunto set my hand at San Francisco, California, this 6th day of December 1918.

ROBERT W. A. BREWER.